(12) United States Patent
Maier-Laxhuber et al.

(10) Patent No.: US 7,213,411 B2
(45) Date of Patent: May 8, 2007

(54) METHOD AND DEVICE FOR THE RAPID SOLIDIFICATION OF AQUEOUS SUBSTANCES

(75) Inventors: Peter Maier-Laxhuber, Pfaffenhofen (DE); Andreas Becky, Ottobrunn (DE); Reiner Wörz, Reichertshausen (DE); Gert Richter, Unterschleissheim/Riedmoos (DE); Norbert Weinzierl, Freising (DE); Ralf Schmidt, Freising (DE); Leo Totschnig, München (DE); Christoph Grupp, Murnau (DE); Manfred Binnen, München (DE)

(73) Assignee: Zeo-Tech Zeolith-Technologie GmbH, Unterschleissheim (DE)

( * ) Notice: Subject to any disclaimer, the term of this patent is extended or adjusted under 35 U.S.C. 154(b) by 282 days.

(21) Appl. No.: 10/932,945

(22) Filed: Sep. 2, 2004

(65) Prior Publication Data
US 2005/0061022 A1 Mar. 24, 2005

(30) Foreign Application Priority Data
Sep. 25, 2003 (DE) ................ 103 44 455

(51) Int. Cl.
*F25D 17/06* (2006.01)
(52) U.S. Cl. ................ 62/480; 62/94; 62/269
(58) Field of Classification Search .......... 62/480, 62/94, 100, 268, 269, 299
See application file for complete search history.

(56) References Cited

U.S. PATENT DOCUMENTS

| 4,479,364 A | 10/1984 | Maier-Laxhuber |
| 4,660,629 A | 4/1987 | Maier-Laxhuber et al. |
| 4,674,563 A | 6/1987 | Maier-Laxhuber et al. |
| 4,752,310 A | 6/1988 | Maier-Laxhuber et al. |
| 4,802,341 A | 2/1989 | Maier-Laxhuber et al. |
| 4,924,676 A | 5/1990 | Maier-Laxhuber et al. |
| 4,956,977 A | 9/1990 | Maier-Laxhuber et al. |
| 5,038,581 A | 8/1991 | Maier-Laxhuber et al. |
| 5,050,403 A | 9/1991 | Maier-Laxhuber |
| 5,054,544 A | 10/1991 | Maier-Laxhuber et al. |
| 5,207,073 A | 5/1993 | Maier-Laxhuber et al. |
| 5,359,861 A | 11/1994 | Maier-Laxhuber et al. |
| 5,404,728 A | 4/1995 | Maier-Laxhuber |
| 5,415,012 A | 5/1995 | Maier-Laxhuber et al. |
| 5,416,251 A * | 5/1995 | Lomasney et al. .......... 588/255 |
| 5,440,896 A | 8/1995 | Maier-Laxhuber et al. |
| 5,482,541 A | 1/1996 | Maier-Laxhuber et al. |
| 5,518,069 A | 5/1996 | Maier-Laxhuber et al. |
| 5,816,069 A | 10/1998 | Ebbeson |

(Continued)

Primary Examiner—Melvin Jones
(74) Attorney, Agent, or Firm—Hôffmann & Baron, LLP

(57) ABSTRACT

A method and devices for the solidification of aqueous substances by the direct evaporation of water from the substance and the sorption of the water vapor in a sorption agent in a vacuum system, wherein the aqueous substance and the sorption agent are evacuated from the surrounding pressure level to a system pressure of below 5 mbar (absolute) by means of a vacuum pump and the nonsorbable gases thereby suctioned by the vacuum pump are suctioned through the sorption agent. The mass of the used sorption agent is at least half the mass of the water fraction in the substance. The solidification process is realized in less than 2 min, particularly less than 20 sec. The aqueous substance is solidified in a solidification container that can be removed from the vacuum system, the vacuum system is subsequently vented, and the solidified substance removed from the vacuum system together with the solidification container.

19 Claims, 4 Drawing Sheets

U.S. PATENT DOCUMENTS

| | | |
|---|---|---|
| 6,112,549 A * | 9/2000 | Yao et al. ................ 62/620 |
| 6,349,560 B1 | 2/2002 | Maier-Laxhuber et al. |
| 6,378,326 B2 | 4/2002 | Maier-Laxhuber et al. |
| 6,412,295 B2 | 7/2002 | Weiss et al. |
| 2004/0079106 A1 | 4/2004 | Maier-Laxhuber et al. |

* cited by examiner

METHOD AND DEVICE FOR THE RAPID SOLIDIFICATION OF AQUEOUS SUBSTANCES

FIELD OF THE INVENTION

The present invention relates to a method and devices for the rapid solidification of aqueous substances by the direct evaporation of water from the substance and the adsorption of the water vapor by a sorption agent under vacuum.

BACKGROUND OF THE INVENTION

Methods and devices for the cooling of aqueous liquids according to the evaporation principle are known. By the suctioning off of water vapor, an aqueous liquid is brought to evaporation and thereby cooled. In order to cool aqueous liquids to temperatures close to the solidification point, considerable water vapor volumes must be suctioned off.

Although direct evaporation makes possible a very rapid and gentle cooling, it has been possible up to now to implement it economically only in a few application cases.

Adsorption devices are devices in which a solid sorption agent sorbs a second agent, the working agent, which boils at lower temperatures, as a vapor, with the release of heat (sorption phase). The working agent thereby evaporates in an evaporator with heat absorption. After the sorption agent is saturated, it can once again be desorbed by the supply of heat at a higher temperature (desorption phase). The working agent thereby evaporates from the adsorption agent. The working agent vapor can be reliquefied and then re-evaporated.

Adsorption devices for cooling with solid sorption agents are known from EP 0 368 111 and DE-OS 34 25 419. Sorption agent containers filled with sorption agents suction off the working agent vapor that is generated in an evaporator and sorb it with the release of heat. This sorption heat must be removed from the used sorption agent. The cooling devices can be used to cool food and to keep it warm in thermally insulated boxes.

In German Patent DE 4003107, a method for making ice under vacuum with a simultaneous sorption of the outflowing water vapor in a sorption agent is described. An aqueous liquid is thereby solidified in a flanged vacuum-tight icing container.

SUMMARY OF THE INVENTION

The present invention involves an economical method and device for the simple and rapid solidification of aqueous substances under vacuum. The method in accordance with the invention permits the cooling and solidification of an aqueous substance within a very short time. The quantity of solidified substance can attain several kilograms per minute without expensive technology and without time-consuming preparations. A simultaneous and expensive removal of heat from the sorption agent is not necessary since the quantity of sorption agent is dimensioned in such a way that its sensible heat capacity is sufficient to buffer heat released during the sorption to such an extent that the sorption reaction is still sufficiently far from its thermodynamic equilibrium point. The solidification takes place within a few seconds as a function of the flow conditions of the water vapor. In accordance with the invention, the sorption agent quantity is so large that the provided substance quantity can be solidified only once or be a multiple thereof. In the latter case, however, the sorption agent should also be able to release heat from time to time.

The sorption agent can attain temperatures of over 100° C. during the sorption process. They are sufficiently high for heating or keeping foods and/or beverages warm.

In accordance with the invention, the sorption agent quantity is to be dimensioned and placed in such a way that only a minimal pressure decline within the sorption agent must be overcome for the inflowing water vapor. The pressure decline may not be more than 5 mbar. Moreover, the sorption agent must offer sufficient surface area to the inflowing water vapor for accumulation. On the other hand, the bulk density of the sorption agent used may not be excessively low, so that no appreciable water vapor can flow through the bed to the vacuum pump. Thus, the bulk density and diameter of the individual sorption agent granules must be adapted to this requirement as a function of type of sorption agent. With granules that contain zeolite, the bulk density is 2 to 5 cm with a typical granule diameter of 3 to 5 mm.

In accordance with the invention, the vacuum system must be designed in such a way that the air and vapor flow suctioned through the vacuum pump are guided through the sorption substance and not partially past it. In addition, care should be taken that within the sorption agent filling, no nonsorbable gases remain that prevent the water vapor from reaching the sorption substance.

The solidification container can assume any arbitrary form and be made from any materials. Technically, it is absolutely necessary that during the solidification process, a sufficiently large opening exists for the flow of the water vapor into the sorption agent. In accordance with the invention, it must be removable from the vacuum system with the solidified substance.

It is advantageous if the aqueous substance can be suctioned into the vacuum chamber or if the aqueous substance is already contained in the solidification container when brought into the vacuum system. Furthermore, it may be advantageous if the solidification container is transparent or edible. Transparent containers permit an observation of the solidification process, if surrounding parts of the vacuum system make possible a look at the solidification container. For the case of ice cream production, the solidification container can assume the form, for example, of a waffle cone.

It may be particularly appropriate to close the solidification container, still under vacuum airtight after the solidification process. It is advantageous, for example, if the solidified substance is frozen water or salt water, which is to be used as a cold-accumulator. As a result of the airtight packaging, the product to be cooled is not wetted and, because of the air-free packing, there is optimal heat transfer to the product. In these cases, it is appropriate to make the solidification container from a flexible, bag-like film material. Under vacuum, it presses close to the shapes of the solidified substance and optimally, if necessary, to the contained sorption agent. For longer vacuum periods, it is recommendable to use multilayer film material. Such multilayer films are used in the food industry, for example, as packaging material for ground coffee. For the method of the invention, reference is made to the known packaging technology in vacuum packaging machines, in order to heat-seal films under vacuum airtight. The heat-sealing of film bags under vacuum is in many applications, especially the food field, state of the art.

According to the invention, the vacuum-packaged, solidified substance can take on the form or application of the product to be cooled. Also, the form of the vacuum chamber can be appropriately matched in this respect. For example, the shape of a drinking or portable vessel can be cited. Either a vessel containing the liquid can be placed into the (evacuated) solidification container or the solidification container itself can be shaped to hold the liquid or food directly.

The closing under vacuum is particularly efficient if, in addition to the solidified substance, the hot sorption agent is also closed within the airtight solidification container under vacuum. In this case, the sorption device continues to function even after removal from the vacuum system. Water vapor can also flow from the solidified substance to the sorption agent, and the generation of cold in the substance and the release of heat from the sorption agent can be maintained. The prerequisite, however, is that the water vapor can also flow within the solidified substance and to the sorption agent. In accordance with the invention, the solidified substance and the solidification container can be characterized by a predetermined geometry of the vacuum chamber, which favors the flow, so that the flow path for the water vapor is formed by the solidified substance itself. Fibrous materials in which the aqueous substance is absorbed and which expand during the evaporation of the outflowing water vapor have proved to be effective for this case. After solidification, the vapor continues to flow to the sorption agent through the expanded cavity structure without the flow being stopped by the film bag pressed strongly by the outer excess pressure. A thermally insulating layer is located, in this case, between the solidified substance and the sorption agent.

Technically and economically interesting are solidification containers in the form of portable food trays with adjacent hot and cold placement surfaces. They can be shaped advantageously to form shells into which the foods can be directly poured. Also advantageous are hot and cold accumulators, in which the hot and cold sides are opposite one another. These can be optimally used to separate hot and cold areas in cooling boxes and portable packaging. Here, an insulating spacer material, which ensures the vapor flow to the sorption agent even in the solidification container pressed by outer air pressure, is placed between the hot and cold areas.

Due to the low pressure within the vacuum system, not-yet solidified aqueous substances can be suctioned in from a container located outside the vacuum chamber. Mechanical conveying devices in the supply conduits are therefore superfluous. It has proved particularly effective to equip the end of the conduit with a nozzle, which imparts angular momentum to the aqueous substance when entering the vacuum chamber and/or which atomizes it into a jet of fine drops.

It is particularly advantageous to construct the conduits in the form of flexible hoses. They can then be easily inserted into commercial supply containers. Mineral water bottles, kegs, milk bottles, and fruit juice containers, for example, have proven to be good supply containers for the aqueous substances.

It is also advantageous to lay several conduits into the vacuum chamber. In this way, several substances can be solidified one after the other (or also simultaneously) in one evacuation process. In the case of ice cream substances, various types of ice cream can be frozen onto or into one another. Moreover, the vacuum chamber is immediately ready to function for different types of ice cream. When a desired type of ice cream is required, only the conduit provided for it need be opened.

During their inflow into the vacuum chamber, many substances foam, particularly fat-containing substances, and freeze in this foamed state. The increase in volume may easily reach 20 times that of the liquid state. New, previously unknown product forms are thereby produced.

With other aqueous substances, it may be of interest to rotate and mix the solidified substance by means of stirrers. Also, in this case, novel forms of appearance can be generated. By means of foam-sweeping devices, it is also possible to suppress undesired foaming of the aqueous substances.

The foaming of frozen substances, using rotating blades to form pasty, foam-like structures, is also known. These treatment techniques can also be used with the already-solidified substances within the evacuation device. It is advantageous if this takes place with the introduction of suitable gases, such as nitrous oxide (laughing gas). The frozen structure thus differs not only in external form but also in internal composition from previously known commercial forms.

In accordance with the invention, the aqueous substance can also be suctioned into an absorbent matrix before solidification. In this case, potential foaming or spraying is suppressed. Fibrous substances, such as wadding, or channel-forming structures, such as corrugated cardboard and, also, edible pastries are advantageous.

It is also advantageous to preserve the aqueous substance in a separate storage and transport packaging before solidification. This packaging is then opened before placing in the evacuation device and the suitably filled, aqueous substance is subsequently frozen. It is particularly advantageous if the transport packaging can be constructed in such a way that it automatically bursts at a location provided for this purpose under vacuum, releasing and distributing the aqueous substance. It is also advantageous if the transport packaging can be a part of the solidification container. In this case, the sorption agent may already be packaged in the solidification container, since the water of the aqueous substance will then not be able to reach the sorption agent during the storage period. Such packaging units contain the aqueous substance and required sorption agent in a user-friendly size, suitable to a portion.

When using fibrous materials, it may, moreover, be appropriate to shape the still-formable fibrous material by a suitable shaping of the vacuum chamber in the area of the placement of the solidification container in such a way that after the solidification of the aqueous substance, the flow path for the water vapor from the substance to be solidified to the sorption agent is retained. Flow channels and a self-supporting structure can thus be produced solely by freezing, without additional supporting means.

The task of the vacuum pump is to lower, as quickly as possible, the system pressure below the water vapor pressure of the substance to be solidified. A pump with a high suction volume is advantageous if the pumping time is to be kept as short as possible. On the other hand, a small pumping output is sufficient during the solidification process, so as to suction the released nonsorbable gases from the sorption substance. If oil-lubricated, sliding vane rotary vacuum pumps are to be used, one must be careful that an oil suction guard is present and the discharge of oil mist from the blow-out is suppressed. In a commercial vacuum packing, corresponding vacuum pumps with a suction output above approximately 20 $m^3/h$ are used. If these pumps can reach the required end pressure of less than 6 mbar, they are also suitable for use in accordance with the invention.

It may be particularly advantageous if the vacuum can be produced without electrical power. In this regard, European Patent EP 611888 describes, for example, a manually operable pump, which attains a sufficiently low end pressure.

The vacuum system should be designed advantageously in such a way that the water vapor can load the sorption substance uniformly. The fraction of cavities and conduits not filled with the sorption substance should be as small as possible, so as to be able to reach the needed operating pressure quickly.

During the sorption reaction, sorption heat is released, which heats the sorption substance. The absorbing capacity for water greatly declines at elevated temperatures. In order to maintain a high cooling output over a longer period of time, it is reasonable to cool the sorption agent by means of suitable cooling devices. In this regard, heat exchangers for air or special cooling water circulations are advantageous. It is also very efficient to place the sorption container in a water bath. The water heated during the cooling process can be subsequently used to clean the device.

The task of the sorption agent is to sorb the water vapor, that is, to condense and bind the water vapor within the crystal structure. Sorption agents have only a limited absorption capacity for water molecules. This capacity is exhausted when, despite the running of the vacuum pump, the solidification output declines or even the solidification temperature can no longer be reached. In this case, the sorption agent must be replaced with a fresh agent or must be regenerated by a supply of heat. In the first case, the vacuum system has an opening through which the saturated sorption agent quantity can be removed and be replaced by a regenerated agent.

To regenerate the sorption agent, it must be heated, depending on the material used, to temperatures between 150° C. and 300° C. If this occurs within the vacuum system, the released water vapor must be able to flow off safely. Advantageously, the desorption takes place by means of hot air within the vacuum system. The outflowing air carries the desorbed water vapor along from the vacuum chamber. For the case that the entire sorption agent filling is renewed, it is advantageous to pack it in a vapor-permeable housing in such a way that it can be replaced together with the housing. As a vapor-permeable housing, structures made of expanded metal, wire netting, wire grating, and temperature-stable mesh are advantageous.

Zeolite is advantageously used as the sorption agent. Zeolite can sorb up to 36 mass% water, reversibly, in its regular crystal structure. Even at relatively high temperatures (above 80° C.) it still has a considerable water vapor sorption capacity and is therefore particularly suitable for use in accordance with the invention.

Zeolite is a crystalline mineral, which consists of a regular lattice structure of silicon and aluminum oxides. This lattice structure contains cavities into which water molecules can be sorbed with the release of heat. Within the lattice structure, the water molecules are exposed to great field forces, whose strength depends on the water quantity already contained in the lattice structure and on the temperature of the zeolite. For practical use, up to 25 grams of water can be sorbed per 100 grams of zeolite. Zeolites are solid substances without a disturbing volume expansion during the sorption or desorption reaction. The lattice structure can be freely accessed from all sides by the water vapor molecules. As a result of the rapid sorption reaction involved, they are particularly suitable for use in accordance with the invention.

For an economical mode of operation, zeolite temperatures of 250 to 350° C. during regeneration and of 50 to 120° C. during sorption are recommended. It is particularly advantageous to carry out the regeneration during a hot air flow at air temperatures above 300° C. If the zeolite filling is located in a thin layer, the regeneration can be concluded within a few minutes.

In order to guarantee uniform sorption within the loaded sorption agent and a low pressure decline, sorption agent granules have proven particularly effective. Granule diameters between 3 and 5 mm exhibit the best results. Particularly with flexible solidification containers which also contain the sorption agent quantity under vacuum, in addition to the solidified substance, plate-shaped zeolite molded articles with fine flow channels have proven effective. They are easy to handle, stable under pressure, and also remain dimensionally stable under pressure, which is different from the case of a loose granule bed.

"Aqueous substances" refers to substances that contain at least enough water to be able to lower the remaining substance to the desired temperature level during the complete evaporation of the water quantity. Examples of liquids in accordance with the invention are water, salt water, juices, soft drinks, coffee, tea, milk, and milk products, such as ice cream mixtures. Also, liquids enriched with more readily volatile substances, such as carbonic acid, alcohol, or aromatic substances, fall under this designation, although they are less suitable for direct cooling because of the parallel evaporation of more readily volatile admixtures. By using vacuum pumps with a strong suction, these readily volatile substances, however, can be suctioned through the sorption agent.

In order to produce the maximum amount of cold, the sorption agent must be able to conduct away its sorption heat—to the outside, for example—between several solidification processes. A particularly intensive cooling effect is attained if the sorber container has a sufficiently large heat exchange surface for the surrounding air flow. It is advantageous if the sorption agent can be cooled to the ambient temperature, in order to be able to sorb the largest possible quantity of water vapor. Solid sorption agents have, however, low thermal conduction and poor heat transfer. Since the heat transfer of an air flow to the sorption-agent heat exchanger is on the same order of magnitude, heat exchangers without fins are recommended, in principle, such as cylindrical, plate-shaped or tubular configurations. Since, in particular, zeolite granules have a low thermal conduction, the sorption containers must be designed in such a way that the average heat conduction path for the converted water quantities does not exceed 5 cm.

If, in accordance with the invention, a new sorption agent is used for each solidification process, a separate heat exchanger is not necessary, since the heat released in the sorption agent is released outside the vacuum system via the container wall.

Other sorption agents, which sorb water vapor and remain solid during the sorption reaction, however, can also be used. Some solid sorption agents, such as molecular sieves, are stable enough to be able to support even thin container walls against excess external pressure without a change in volume. Additional rigid structures or thick-walled heat exchanger surfaces are therefore not necessary. This characteristic can be advantageous with vacuum-tight solidification containers in accordance with the invention.

It may also be advantageous to provide the container containing the sorption agent with thermal insulation, in order to minimize the heat loss to the surroundings during the desorption process.

The preferred embodiments of the method and devices for the rapid solidification of aqueous substances, as well as other objects, features and advantages of this invention, will be apparent from the following detailed description, which is to be read in conjunction with the accompanying drawings.

DETAILED DESCRIPTION OF THE PREFERRED EMBODIMENTS

Figure 1:
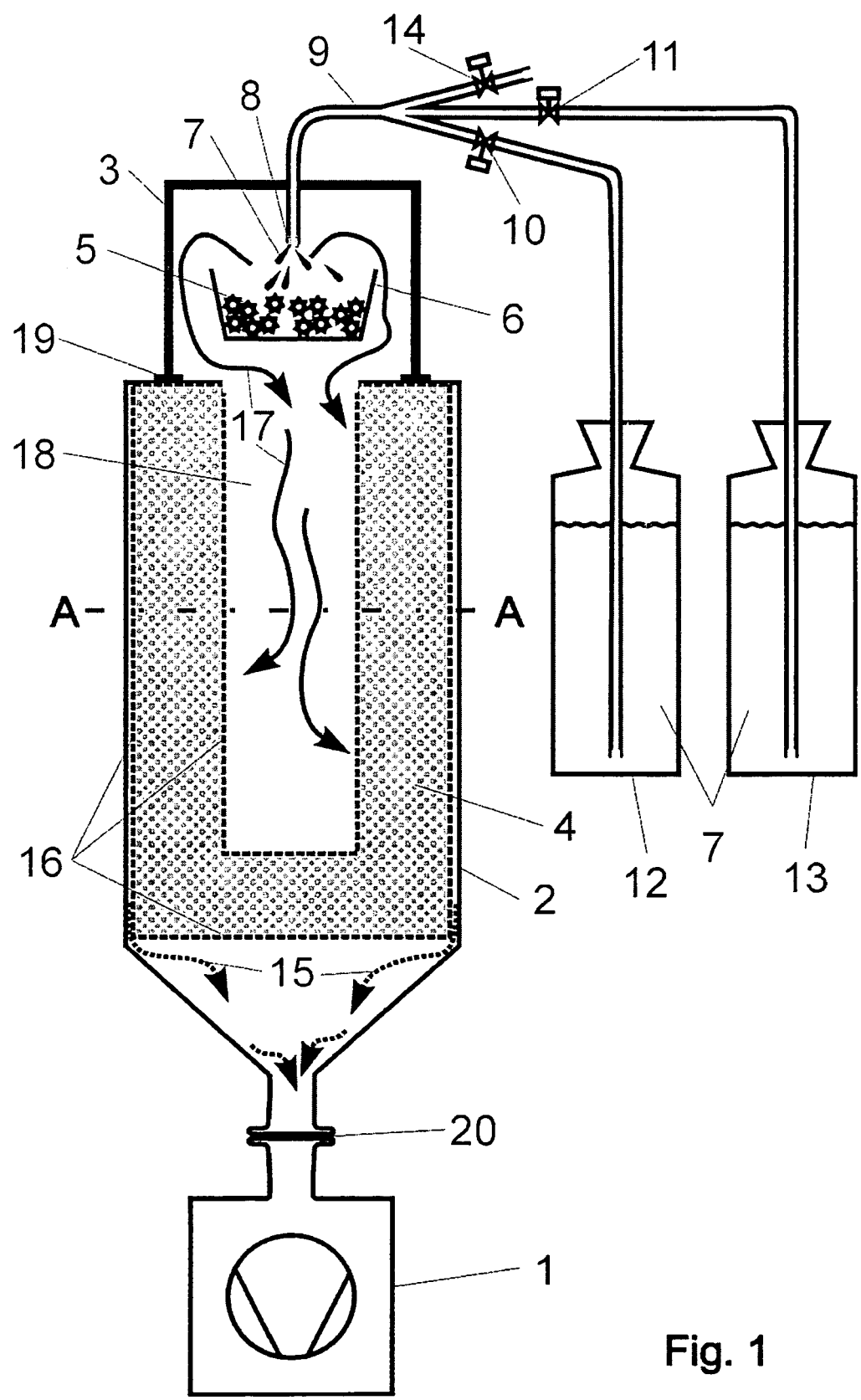
FIG. 1 shows an evacuation device, in accordance with the invention, in a schematic and sectioned representation.
Figure 1A:
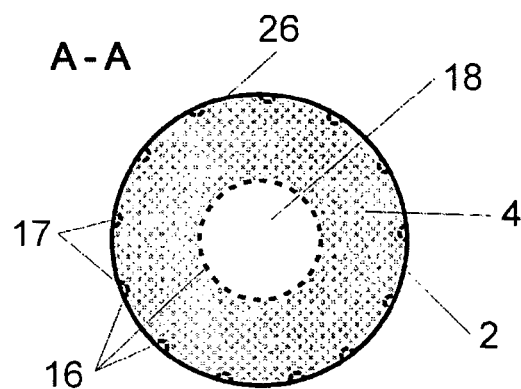
FIG. 1a shows the sorption agent container in a cross section at A—A of FIG. 1.
Figure 2:
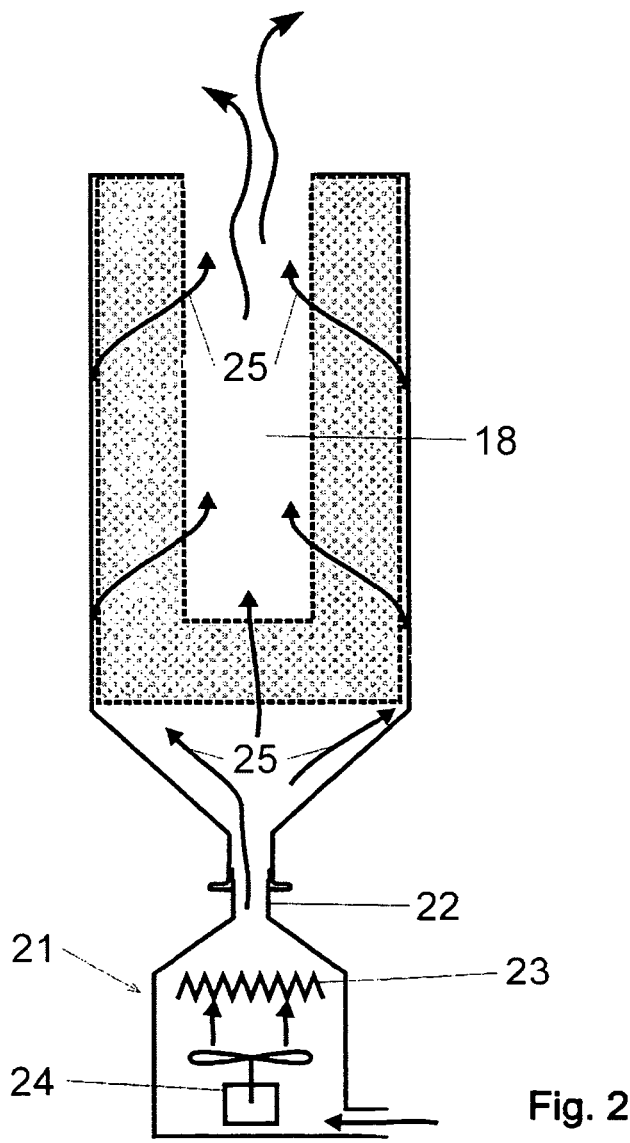
FIG. 2 shows a regeneration station for a sorption agent container.

The evacuation device according to FIG. 1 consists of a vacuum pump 1, which can evacuate one sorption agent container 2 and a vacuum chamber 3. The sorption agent container 2 contains a sorption agent 4, embedded in a metallic perforated sheet housing 16 for the unhindered acceptance of water vapor. The transparent vacuum chamber 3, which can be removed from the sorption agent container 2 on a packing strip 19 also contains a transparent solidification container 6 into which an aqueous substance 7 is sprayed from a nozzle 8. By a momentary evaporation of water from the aqueous substance 7, a foam-like solidified substance 5 is formed. The nozzle 8 is connected to supply tanks 12, 13 for aqueous substances 7 via a conduit 9 and solenoids 10, 11. The evacuation device can be vented through a venting valve 14. The sorption agent container 2 can be separated from the rest of the vacuum system at a connection site 20, and, as shown in FIG. 2, can be set on a regeneration unit 21. This contains a connection piece 22 for arrangement of the sorption container 2, an electrical heating device 23, and a blower 24, which moves the heated air along arrows 25 through the sorption agent 4 under pressure.

FIG. 1 a shows a cross section of the cylindrical sorption container 2 along line A—A of FIG. 1. Along the cylindrical outside shell 26, thirteen flow channels 17 are located, via which air and nonsorbable gases from the vacuum system must be suctioned without drawing off water vapor at the same time. Due to the cylindrical arrangement, the water vapor (and the nonsorbable gases) flow far into the sorption agent 4 along the interior channel 18. There is a large inflow surface for the rapid sorption of the large water vapor volumes along the interior channel 18. The uniform distribution of the flow channels 17 along the outside shell 26 ensures that the flow path for the water vapor within the sorption agent 4 is uniformly long. Only in this way can it be ensured that all sorption agent areas can sorb water vapor sufficiently before the first water vapor molecules reach the flow channels 17 and are suctioned by the vacuum pump. Between the flow channels 17, there is a sufficiently large contact surface for the sorption agent 4 with the outside shell 26 of the sorption container 2, in order to be able to release sorption heat to the environment.

In the evacuation device according to FIG. 1, in accordance with the invention, the solidification container 6 for the solidification of aqueous substances 7 is inserted into the vacuum chamber 3, and the vacuum chamber 3 is placed vacuum-tight on the sorption agent container 2. The vacuum pump 1 is started with the venting valve 14 closed. It suctions gas from the vacuum system through the sorption agent 4. With an interior pressure of less than 6 mbar (abs.), one (or both) of the solenoids 10, 11 is opened. Aqueous substance 7, for example, a finished mixture for the preparation of ice cream, is suctioned from the nozzle 8. The finished mixture can then flow from the supply tanks 12, 13 via the conduit 9. By the sudden evaporation in the vacuum system, the substance 7 solidifies to form a foam-like ice structure 5. The water vapor flows via the interior channel 18, along the vapor arrows 17, into the sorption agent 4. Here, the vapor is momentarily sorbed and embedded into the cavity structure of the sorption agent 4. Only nonsorbable gases are suctioned by the vacuum pump 1 through the sorption agent 4, along the arrows 15. The quantity of the sorption agent 4 is dimensioned in such a way that in spite of the temperature increase, water vapor is sufficiently evaporated from the substance to be solidified and can be absorbed by the sorption agent. After solidified substance 5 is sufficiently produced, the solenoids 10, 11 are closed; the vacuum pump 1 is turned off; and the venting valve 14 is opened. Upon opening the venting valve 14, both the aqueous substance 7, still located in the conduit 9, and the conduit 9 are cleaned, together with the nozzle 8. After the quick flooding of the evacuation device, the vacuum chamber 3 can be lifted and the solidification container 6, together with the solidified substance 5, can be removed. Then, with loading of sufficiently dimensioned sorption agent, the next solidification process can be initiated, without any waiting time.

In order to regenerate saturated sorption agent 4 within the sorption agent container 2, the container is separated from the remaining vacuum system and placed on the connection pieces 22 of the regeneration unit 21 (FIG. 2). By means of the blower 24 and the electrical heating device 23, hot air of at least 200° C. is pressed through the sorption agent 4 in the reverse flow direction 25. The hot air heats the sorption agent 4 and transports the thereby desorbed water vapor from the sorption container 2. Regeneration is then considered concluded if the water vapor flow from the sorption agent ceases and/or the temperature of the sorption agent 4 is homogeneous that of the hot air. After the cooling of the sorption agent 4, the sorption agent container 2 can again be integrated with the remaining evacuation device.

Figure 3:
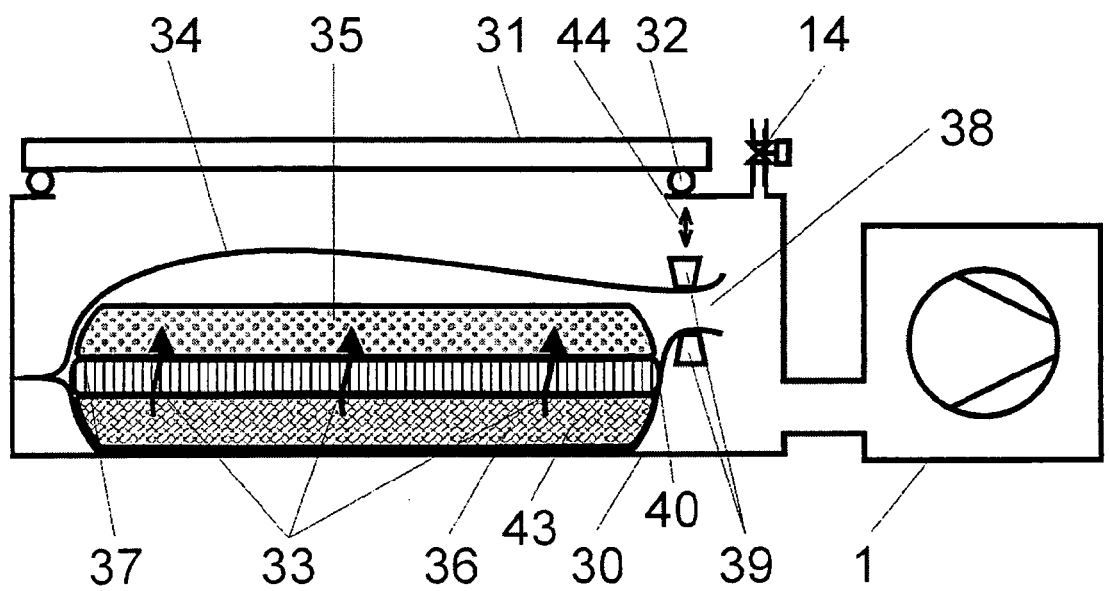
FIG. 3 shows an alternative embodiment of an evacuation device, in accordance with the invention.

FIG. 3 shows another embodiment of an evacuation device in accordance with the invention. The vacuum pump 1 is connected to a vacuum chamber 30 that can be closed vacuum-tight via a transparent cover 31 and a seal 32. A flexible, bag-like solidification container 34 is in the vacuum chamber 30, in which a plate-like sorption agent 35 and an aqueous substance 36 are contained. The aqueous substance 36 is bound in an absorbent material 43, which is covered on its upper side with a water-repellant, vapor-permeable and insulating spacer material 37. The spacer material 37 is used, on the one hand, to guide the water vapor flowing away from the aqueous substance 36 specifically to the sorption agent 35 during the sorption reaction and, on the other hand, to prevent the water from reaching the sorption agent 35 in liquid form.

The opening 38 of the solidification container 34 is located between two heat-sealing terminals 39, which heat-seal the solidification container 34 vacuum-tight when the upper heat-sealing terminal 39 is lowered in the direction of the double arrow 44 while still under vacuum.

For the solidification of the aqueous substance 36 according to FIG. 3, a flexible container 34 in the form of a multilayer film bag, which already contains the sorption agent 35, the spacer material 37, and a nonaqueous absorbent material 43, is first opened at a provided site. The absorbent material is then soaked with water by immersing in a water pan. The unit thus prepared is pushed into the solidification container 34, which, together with it, is placed in the vacuum chamber 30 with the opening 38 between the two heat-sealing pincers 39. During the insertion, care should be taken that, particularly in the area 40, the spacer material and the solidification container 34 form a barrier that is impenetrable to water vapor. In no way should the water vapor be suctioned by the vacuum pump, circumventing the sorption agent 35. The cover 31 and the venting valve 14 are then closed and the vacuum pump 1 started. The water begins to evaporate as soon as the falling pressure level has reached the vapor pressure of the hydrous substance 36. The water vapor flows through the spacer material 37 to the sorption agent 35, which immediately sorbs it. With a further reduction in pressure, the solidification point is reached, where the hydrous substance 36 begins to freeze. At the latest, at this time, the opening 38 of the solidification container 34 can be sealed vacuum-tight by actuating the heat-sealing terminal 39. The vacuum pump 1 can then be turned off, and the vacuum chamber 30 flooded via the venting valve 14. After opening of the cover 31, the solidification container 34 can be removed from the vacuum system and conveyed to its destination. Since the sorption reaction continues inside the vacuum-sealed solidification container 34, heat from the sorption agent 35 and cold from the solidified substance 36 are released.

Figure 4:
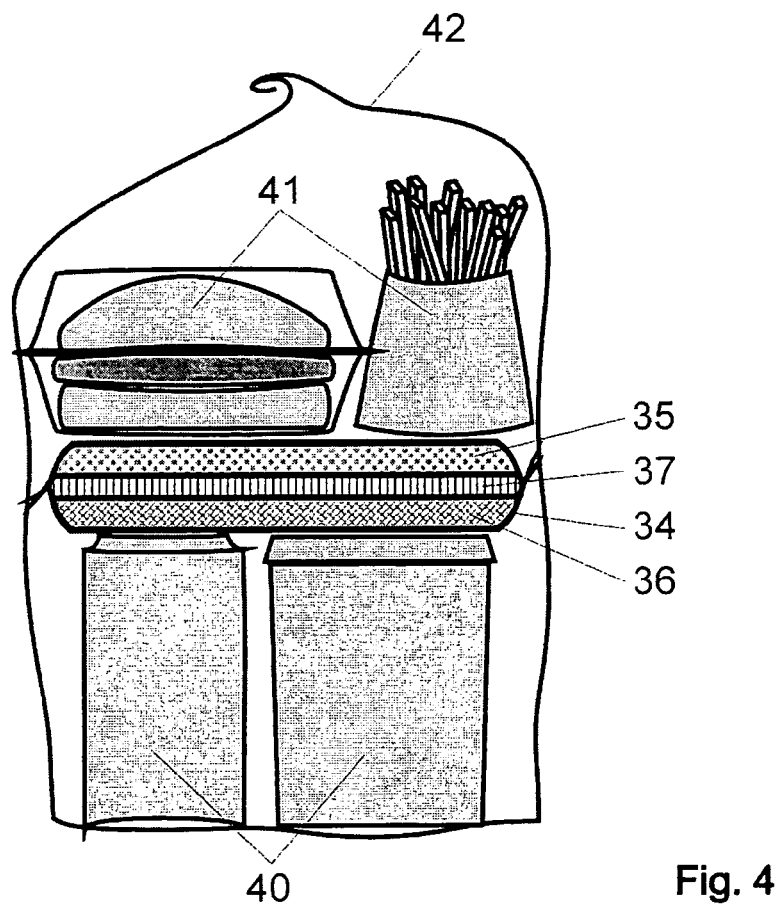
FIG. 4 illustrates an example of the use of a solidification container of the present invention.

FIG. 4 shows a possible application of the vacuum-sealed solidification container 34. The lower portion of paper packaging 42 contains foods 40 to be cooled, such as beverage cans and salad bowls. Above this area are located the evacuated solidification container 34 with the solidified substance 36, pointing down. The heat-releasing sorption agent 35 heats warm foods 41, such as a hamburger and french fries, located above it. As the aqueous substance 36, one can use tap water. The solidification point is then exactly at 0° C. Advantageously, salt water can also be used. The freezing point is then, depending on the salt content, clearly below 0° C., in the coldest case, at −18°. Even at these low temperatures, the zeolite plate used as the sorption agent 35 can release heat to a level above 80° C.

Advantageously, the solidification container 34 is also to be placed vertically in an insulated box (not shown), and the interior space of the box is to be subdivided into adjacent cold and warm areas.

Figure 4A:
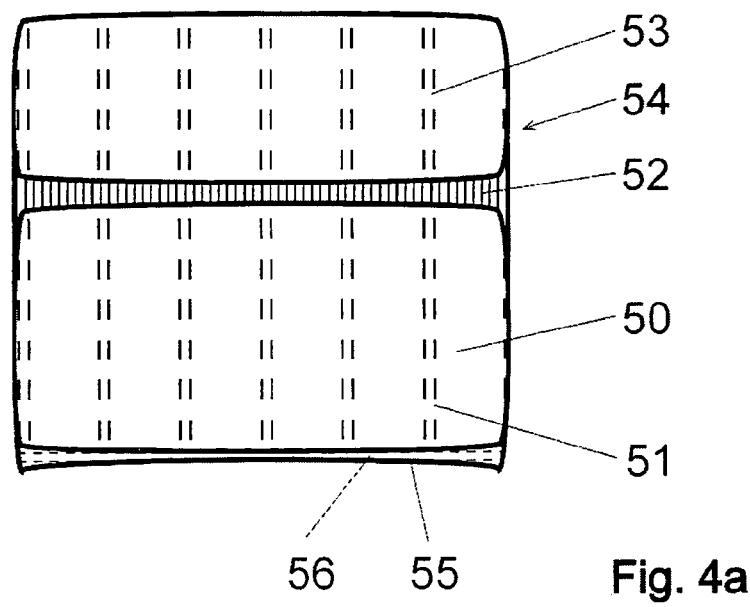
FIG. 4a shows an alternative embodiment of a solidification container in the form of a food tray.

FIG. 4a shows another advantageous embodiment of a solidification container 54 in the form of a food tray. The flat food tray contains a cold area traversed by flow channels 53, which consists of frozen corrugated cardboard previously soaked with water. The solidification takes place in a vacuum chamber similar to FIG. 3. In this embodiment, the sorption agent 4 is a flat, pressed zeolite plate 50 with incorporated flow channels 51. The thermally insulating spacer material 52 is made of plastic films shaped like corrugated cardboard, which permit the unhindered flow of the vapor, although the film bag 55 lies against the inside structures due to the external air pressure. The opening 56 of the film bag 55 is heat-sealed vacuum-tight. Since the sorption reaction can take place even outside the evacuation device, thanks to the vacuum-tight channels 53, 51, the food tray cools and heats the foods set aside for eating. The food tray can contain additional indentations and borders, which can be used for the direct holding or separating of foods.

Figure 5:
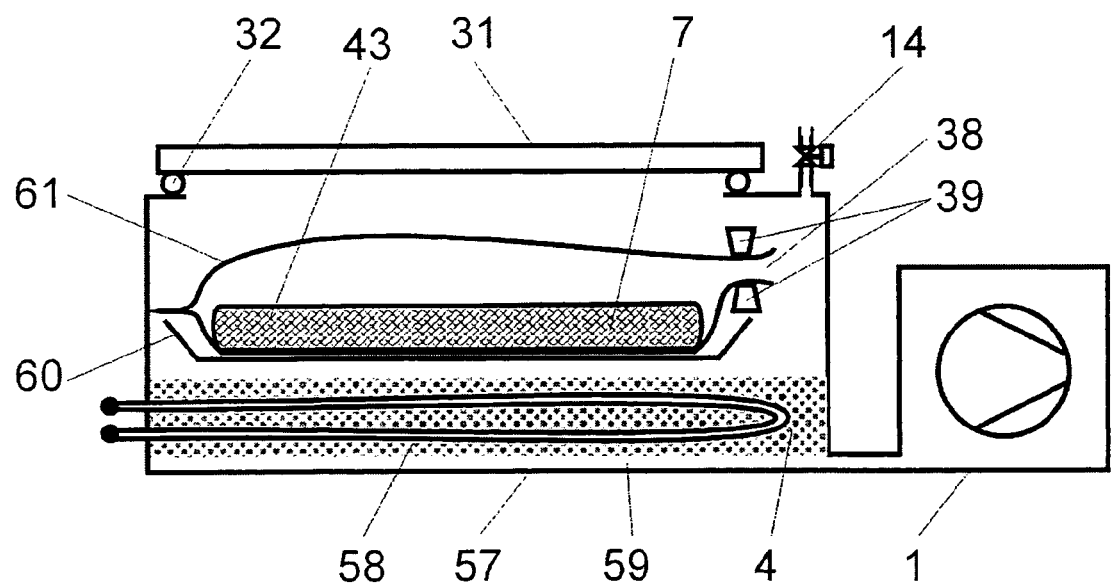
FIG. 5 shows an evacuation device with integrated electrical heating.

FIG. 5 shows another advantageous evacuation device. Reference symbols, which already occur in the preceding drawings, are retained.

The sorption agent 4 is located in the lower part of the vacuum chamber 57 in good contact with an electrical heating device 58. The vacuum pump 1 suctions air and nonsorbable gases from the vacuum chamber 57 via a flow channel 59 running below the sorption agent 4. There is a flexible multilayer bag 61 on a pan 60 placed above the sorption agent 4, which contains an absorbent material 43, soaked with the aqueous substance 7. The solidification container 53 can be introduced into the vacuum chamber 50 via a cover 31. The opening 38 of the multilayer bag 61 is also located in this arrangement between two movable heat-sealing terminals 39. In contrast to FIG. 3, the sorption agent 4 is located outside the solidification container. For the regeneration, it remains inside the vacuum chamber 57. It can be heated via the electrical heating device 58. The escaping water vapor flows unhindered through the cover 31, which is then opened.

At the beginning of the evacuation process, the absorbent material 43 soaked with the aqueous substance 7 is placed in the multilayer bag 61, the opening 38 of which is placed in turn between the heat-sealing terminals 39. After closing the cover 31 and the venting valve 14, the vacuum pump 1 also pumps down the vacuum chamber 57. The water vapor flowing away from the substance 7 to be solidified is sorbed by the sorption agent 4. After the solidification of the substance 7, the multilayer bag 61 is sealed while still under vacuum, and after flooding, the vacuum chamber 57 is subsequently removed. The ice accumulator formed within a few seconds in this way can, for example, be used to keep foods and beverages cold in cooling pockets. Since the water that melts with time is under vacuum, there is good thermal contact with the multilayer bag 61. The melted water cannot moisten the contents of the cooling pocket.

Although the preferred embodiments of the present invention have been described with reference to the accompanying drawings, it is to be understood that the invention is not limited to those precise embodiments, and that other changes and modifications may be made by one skilled in the art without departing from the scope or spirit of the invention.

What is claimed is:

1. A method for the solidification of an aqueous substance by the direct evaporation of water from the substance and the sorption of the water vapor in a sorption agent within a vacuum system, the method comprising the steps of:

evacuating the aqueous substance and the sorption agent from the surrounding pressure level to a system pressure of below 5 mbar (absolute) by means of a vacuum pump;

suctioning nonsorbable gases through the sorption agent with the vacuum pump, wherein the mass of the used sorption agent is at least half the mass of the water fraction in the substance;

attaining the solidification process in less than 2 min, wherein the aqueous substance solidifies in a solidification container which can be removed from the system;

subsequently venting the vacuum system; and removing the solidified substance from the vacuum system together with the solidification container.

2. A method according to claim 1, wherein the aqueous substance is suctioned into the vacuum system and solidifies upon entry.

3. A method according to claim 1, wherein the sorption agent is regenerated after being saturated with water vapor by exposure to hot air flows.

4. A method according to claim 1, wherein the sorption agent is introduced into the vacuum system before each solidification process, suitable to the quantity and type of substance to be solidified.

5. A method according to claim 1, wherein the aqueous substance is thoroughly mechanically mixed during the solidification process.

6. A method according to claim 1, wherein the aqueous substance is absorbed in an absorbent structure, which suppresses spraying with a rapid evacuation and solidification process.

7. A method according to claim 1, wherein the solidified substance is packed airtight in the solidification container while still in the vacuum system, and after venting the vacuum system, remains vacuum-packed.

8. A method according to claim 7, wherein the sorption agent, together with the solidified substance in the solidification container, is also sealed airtight, and a flow connection is retained for water vapor from the solidified substance to the sorption agent.

9. A method according to claim 1, wherein the solidified substance is foamed to a higher volume while still within the vacuum system with a supply of gas by mechanical processing.

10. A method according to claim 1, wherein the evaporating water is sorbed in a zeolite-containing sorption agent.

11. An evacuation device for the solidification of an aqueous substance by the direct evaporation of water from the substance and the sorption of the water vapor in a sorption agent, the device comprising:
a sorption agent;
a mechanical vacuum pump with an end vacuum of less than 5 mbar absolute for evacuating the aqueous substance and the sorption agent from the surrounding pressure level to a system pressure of below 5 mbar (absolute) and suctioning nonsorbable gases through the sorption agent;
a vacuum chamber to hold a solidification container and the substance to be solidified, the vacuum chamber including an opening to remove the solidified substance; and
a venting device to vent the vacuum chamber.

12. An evacuation device according to claim 11, further comprising at least one blockable supply tube for the aqueous substance into the vacuum chamber.

13. An evacuation device according to claim 11, further comprising a stirring device to move the aqueous substance within the vacuum chamber.

14. An evacuation device according to claim 11, further comprising a heating device to heat the sorption agent.

15. An evacuation device according to claim 11, further comprising a solidification container for containing the solidified aqueous substance and a closure device for vacuum-tight closing of the solidification container within the vacuum chamber.

16. A solidification container for containing an aqueous substance during solidification by the direct evaporation of water from the substance and sorption of water vapor in a sorption agent within a vacuum system and for transporting and storing the aqueous substance, the solidification container comprising an opening which can be created for the water vapor to flow away before solidification of the aqueous substance, and further comprising a flexible shell contained therein, the flexible shell being adapted to vacuum-tight seal the solidified substance.

17. A solidification container for containing an aqueous substance during solidification by the direct evaporation of water from the substance and sorption of water vapor in a sorption agent within a vacuum system and for transporting and storing the aqueous substance, the solidification container comprising an opening which can be created for the water vapor to flow away before solidification of the aqueous substance, wherein the container is adapted to contain both the aqueous substance and the sorption agent quantity required for solidification.

18. A solidification container according to claim 17, further comprising a flexible shell contained therein, the flexible shell being adapted to vacuum-tight seal the solidified substance and the sorption agent.

19. A solidification container for containing an aqueous substance during solidification by the direct evaporation of water from the substance and sorption of water vapor in a sorption agent within a vacuum system and for transporting and storing the aqueous substance, the solidification container comprising an opening which can be created for the water vapor to flow away before solidification of the aqueous substance, wherein the solidification container is adapted to contain an edible material or a sorption agent.

* * * * *